Sept. 11, 1962          D. L. HELLER          3,054,095

REMOTE METER READING SYSTEM

Filed Dec. 7, 1959          2 Sheets-Sheet 1

INVENTOR.
David L. Heller
BY Ralph Hammar
Attorney

United States Patent Office 3,054,095
Patented Sept. 11, 1962

3,054,095
REMOTE METER READING SYSTEM
David L. Heller, Levittown, Pa., assignor to American Meter Company, Incorporated, Philadelphia, Pa., a corporation of Delaware
Filed Dec. 7, 1959, Ser. No. 857,867
5 Claims. (Cl. 340—184)

This invention is a remote meter reading system for gas and water meters and the like which permits readings of meters to be taken at any point remote from the meter itself. The usual installation will be to place the meter wherever convenient inside and to read the meter from the outside of the building. To read the meter, the meter reader carries with him a compact light weight readout unit which is about the size and weight of a flashlight. While the unit may be hand held, preferably, it is attached to the meter reader's book. Associated with the readout unit is a coupling which is inserted into a receptacle on the outside of the building. Current from batteries in the readout unit travels through a cable to potentiometers in the meter associated with the meter register dial hands causing the position of the dial hands on the meter register to be indicated on scales located in the readout unit. After noting the meter reading, the readout unit is disconnected and the indications on the readout scales return to zero.

If, for any reason, it is desired to check the reading obtained on the outside against that on the meter register inside, this can easily be done because the meter register has the full set of dial hands.

There is no electricity in the meter or cable or outside receptacle except when the reading is actually being taken. There is no friction load added to the meter while the reading is being taken. The system accordingly does not interfere with meter accuracy.

Figure 1:
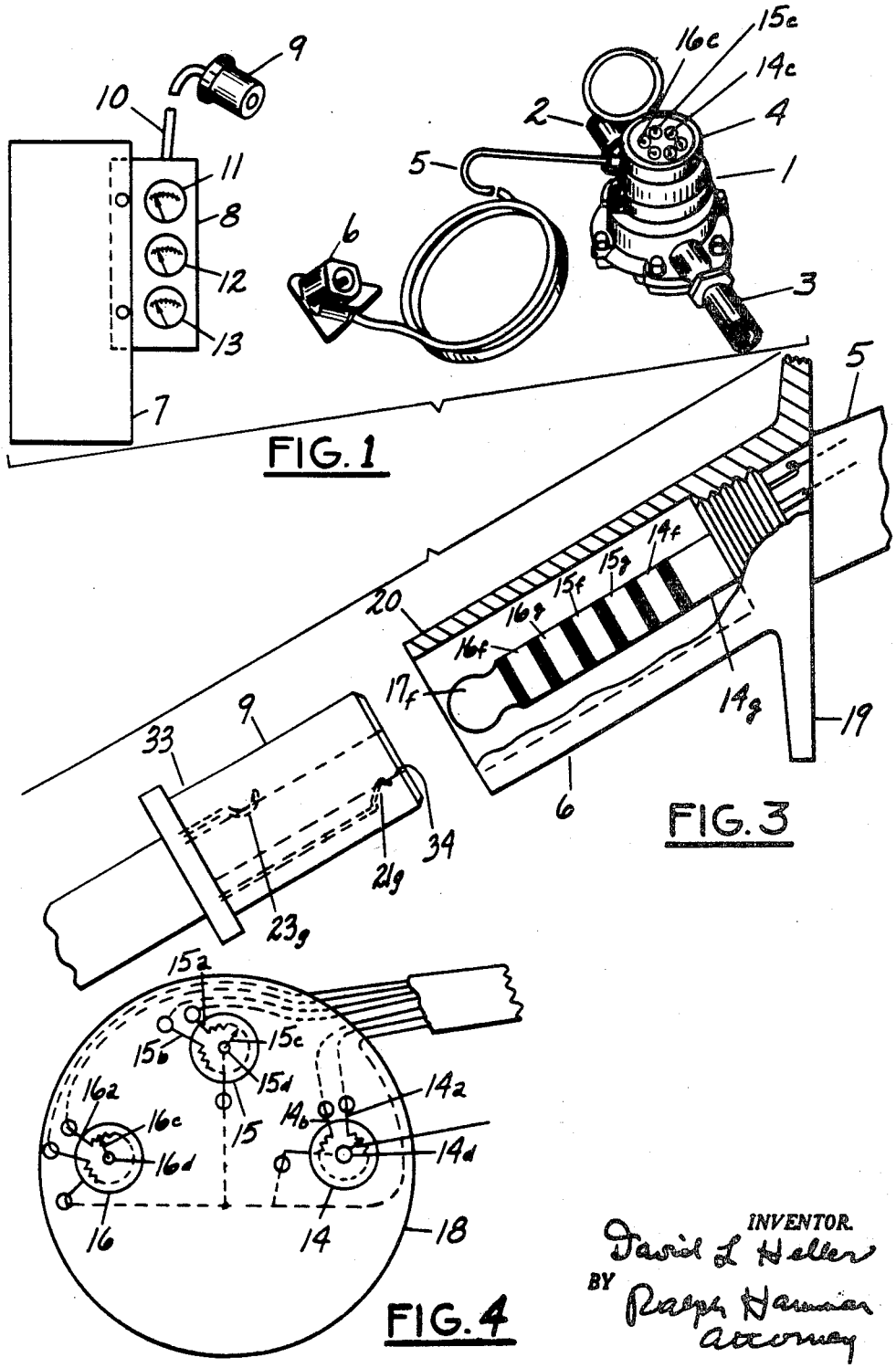
Figure 2:
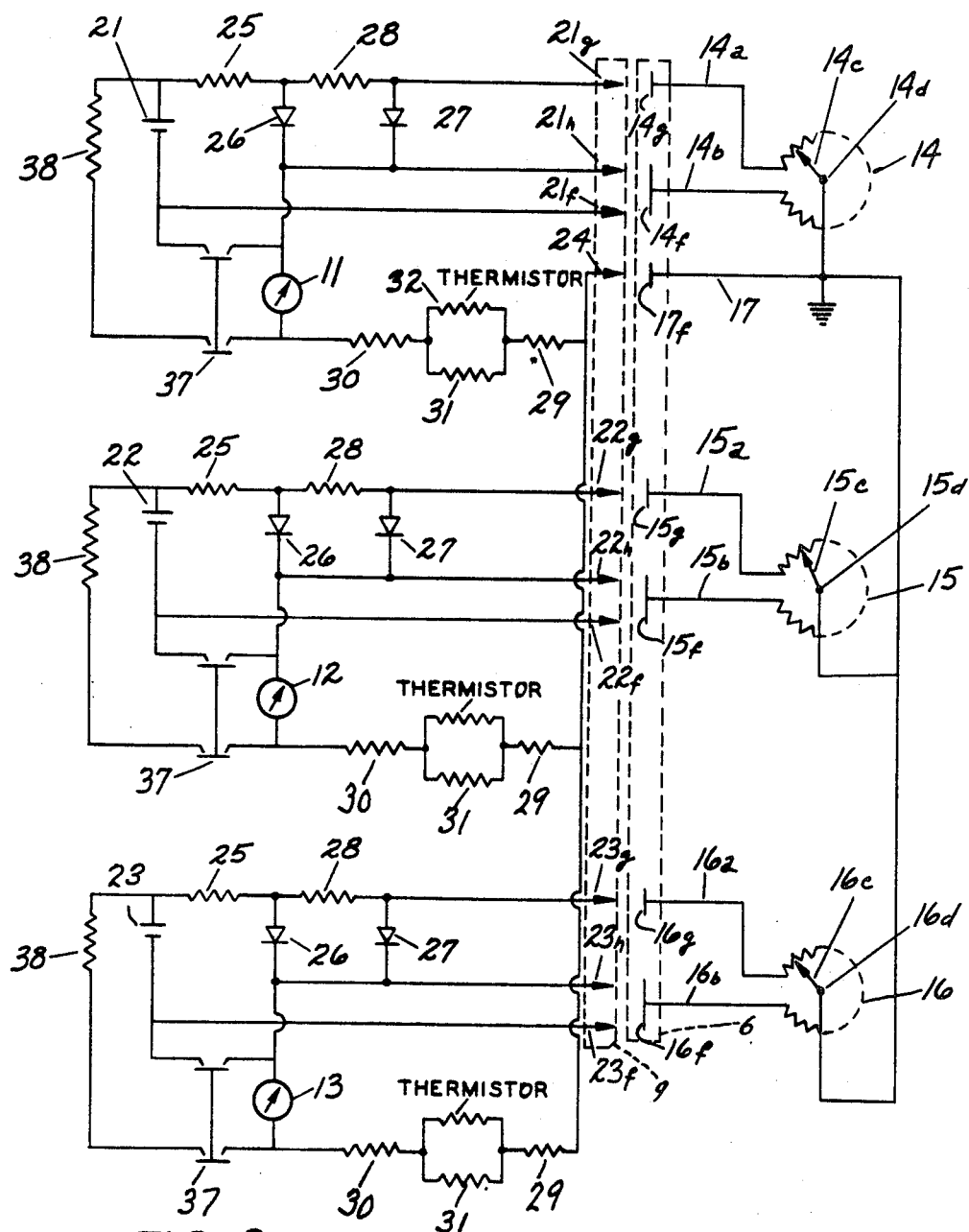

In the drawing, FIG. 1 is a perspective of the parts of the remote meter reading system, FIG. 2 is a circuit diagram, FIG. 3 shows the receptacle installed on the outside of a building and the coupling of the meter readout unit in position to be coupled into the receptacle, and FIG. 4 is a bottom plan of the plate below the meter register on which the potentiometers are mounted.

FIG. 1 shows the parts of the meter reading system. At the right are the parts to be installed in the building serviced, namely the meter 1 with its inlet and outlet fittings 2, 3 and register 4, and a length of multiconductor cable 5 connecting the meter with a receptacle 6 to be installed in a convenient location, usually on the outside of the building serviced. At the left in FIG. 1 are shown the parts to be carried by the meter reader, namely the usual meter reader's book 7 and the meter readout device 8, preferably mounted on one of the covers of the book and having a coupling 9 connected to the readout device by a short length of cable 10. The meter reader makes his reading by plugging the coupling 9 into the receptacle 6, thereby establishing connection between the meter readout device 8 and the meter 1 and causing the meter reading to appear on galvanometer scales 11, 12, 13 corresponding to the orders of digits to be read. Meters are ordinarily read to three significant digits, which is the reason for the three scales 11, 12, 13.

The arrangement for transmitting the meter register reading to the meter readout device is shown in the circuit diagram of FIG. 2. At the meter are potentiometers 14, 15, 16, respectively connected across conductors 14a, 14b, 15a, 15b, 16a, 16b. In each of the potentiometers is a grounded wiper contact 14c, 15c, 16c rotated by the associated meter register shaft 14d, 15d, 16d. The grounded wipers are connected in parallel to a conductor 17. The potentiometers are conveniently mounted on the underside of a plate 18 beneath the meter register so that the wipers 14c, 15c, 16c, have the same relative position as the pointers 14e, 16e, 17e on the meter register. The meter registration can accordingly be determined at the meter by inspection of the pointers in the usual manner.

For remote registration, the conductors 14a, 14b, 15a, 15b, 16a, 16b and 17 which comprise the conductors of the multiconductor cable 5 are led to contacts 14f, 14g, 15f, 15g, 16f, 16g and 17f in the receptacle 6 which is mounted in a convenient location accessible to the meter reader, usually on the outside of the building serviced. For such mounting, the receptacle has a flange 19 which is attached to the outside of the building, after drilling a hole in the building wall for the cable 5. The receptacle has a downwardly inclined open ended tube 20 concentric with and surrounding a male contact member having the contacts 14f, 14g, 16f, 16g, 17f spaced along its length and insulated from each other. The contacts are in the form of conducting rings. The downwardly inclined tube 20 protects the contacts from the elements and is self draining.

The circuit at the left in FIG. 2 is contained in the meter readout device 8 carried by the meter readout unit. The power is obtained from three separate dry cells 21, 22, 23 respectively connected across contacts 21f, 21g 22f, 22g, and 23f, 23g. These contacts as well as ground contact 24 are located in the coupling 9 so that the dry cells are open circuited until the coupling is inserted into the receptacle 6. When this is done, the common ground contact 24 in the coupling 9 is connected to the common ground contact 17f in the receptacle and the contacts associated with each dry cell are connected with the contacts associated with one of the potentiometers. For example, the contacts 21f and 21g associated with the dry cell 21 are connected to the contacts 14f and 14g associated with the potentiometer 14, thereby connecting the dry cell 21 across the potentiometer 14. At the same time, the contact 21f is shorted to the contact 21h by the contact 14f. Similarly, the dry cell 22 is connected across the potentiometer 15 and the dry cell 23 is connected across the potentiometer 16.

Because the dry cell voltage is subject to variation both with load and with ambient temperature, it is necessary that the dry cell voltage be regulated in order that a constant voltage may be applied across the potentiometers under all conditions. The load regulation is obtained by each dry cell connected through two sections, each consisting of a series resistance and a non linear shunt element having a rapid increase in current whenever the voltage exceeds a threshold value. The first section comprises series resistance 25 and shunt diode 26. The second section comprises series resistance 28 and shunt diode 27. One section is adequate. Three or more sections could be used for extremely precise regulation. The diodes 26, 27 have the characteristic of having a rapid increase in current whenever the voltage exceeds a rated value. The diodes 26, 27 accordingly serve as voltage limiters in the sense that each tends to prevent a rise in voltage above the rated value at which the current conduction suddenly increases. The value of this voltage for the diode 27 is less than the value for the diode 26 which, in turn, is less than the voltage of the battery. Where the battery is a standard "AA" single dry cell, the rated voltage of the diode 27 may be .64 volt and the rated voltage of the diode 26 may be 1.1 volts. These voltage ratings are readily obtainable in silicon diodes. Other non linear elements such as solid state non linear components can be used in place of the diodes. Transistors will function in the same manner as the diodes, but are not necessary. The combined effect of the diodes 26, 27 and the associated resistances 25, 28 is to regulate the battery voltage to substantially .64 volt.

The rated voltage of the silicon diodes 26, 27 is subject to ambient temperature variation which is compensated by the network in the ground return line comprising resistances 29, 30 in series with a resistance 31 in parallel with a thermistor 32. The thermistor changes its resistance with ambient temperature in the same direction as the diodes 26, 27 but the change in the thermistor is exponential while the change in the diodes is linear. However, by shunting the thermistor 32 by the resistance 31, the combined effect of the resistances and thermistor 29–32 can match the change in voltage rating of the diodes 26, 27 so that the operation is unaffected by temperature. By means of the voltage regulation and ambient temperature compensation, the voltage connected across the galvanometers 11, 12 and 13 accurately reflects the position of the wipers 14c, 15c, 16c and accordingly the reading on the galvanometer scales corresponds to the position of the meter register shafts. The voltage regulation and ambient temperature compensation are important because the galvanometers measure only the voltage and do not measure the angular positions of the wipers. Also, the human element is eliminated because the regulator is automatic.

The coupling 9 comprises a body 33 having a central bore 34 for receiving the prong of the receptacle. Projecting into the bore 34 are contacts 21g, 21h, 21f, 22g, 22h, 22f, 23g, 23h, 23f, two of which are indicated diagrammatically in dotted lines at 21g, 23g, each of which engages a different one of the contacts on the prong. Because all of the contacts on the prong in the receptacle are of annular form, the plug carried by the meter reader can be inserted in any position and will make the necessary contact.

In the use of the meter reading system, the meter reader inserts the coupling 9 of his meter readout unit in the receptacle 6 and the meter reading immediately appears upon the galvanometer scales 11, 12, 13. These scales are read in the same way as the meter register dials, and can be read with the same degree of accuracy.

While the batteries 21, 22, 23 have relatively constant voltage throughout the greater part of the life, the battery voltage may drop off toward the end of the battery life to a greater extent than can be accommodated by the voltage regulating network. In order to determine whether the batteries are in condition for use, the meter reader pushes a button 37 which connects the associated battery through a resistance 38 directly across the associated galvanometer 11, 12 or 13, as the case may be. Under this condition, the galvanometer reading will indicate whether the battery voltage is high enough. If the battery voltage on one of the batteries is too low, all three of the batteries should be discarded. Accordingly, although three of the push-buttons 27 are illustrated, in practice it will be satisfactory to have only one push-button associated with one of the batteries.

Because the ends of the potentiometers 14, 15, 16 are slightly separated, there is possible ambiguity as the meter register shaft turns from the digit 9 through the digit 0. This ambiguity is eliminated by making the separation between the ends of the potentiometers less than half a digit and usually about one quarter of a digit. This space between the ends of the potentiometer is a small "dead-space" which may be either open or shorted by the associated potentiometer wiper 14c–16c; If the wiper does not bridge the "dead-space" no current is conducted to the associated galvanometer and the galvanometer reading is zero. If the wiper bridges the "dead-space," the battery voltage is short-circuited and the galvanometer reading is again zero because it is shunted by zero resistance. Short-circuiting the "dead-space" by the wiper does no harm because the voltage regulator network limits the short-circuit current to a safe value of battery drain.

What is claimed as new is:

1. A remote reading system for a meter having a register with a plurality of shafts, one for each order of digits, comprising a plurality of potentiometers, one for each shaft, and each having a wiper rotated by the associated shaft, a multiconductor cable having a pair of conductors connected respectively to opposite ends of each potentiometer and a conductor connected in parallel to the wipers of all potentiometers, a receptacle remote from the meter having contacts for the respective conductors, a meter readout unit having a coupling for connection to the contacts of the recetpacle, a plurality of batteries in the readout unit, one connected across the ends of each potentiometer through the contacts in the coupling and receptacle, and a plurality of galvanometers in the readout unit, one connected across the wiper and one end of each potentiometer whereby each galvanometer indicates the register shaft position for a different order of digits.

2. A remote reading system for a meter having a register with a plurality of shafts, one for each order of digits, comprising a plurality of potentiometers, one for each shaft, and each having a wiper rotated by the associated shaft, a multiconductor cable having a pair of conductors connected respectively to opposite ends of each potentiometer and a conductor connected in parallel to the wipers of all potentiometers, a receptacle remote from the meter having contacts for the respective conductors, a meter readout unit having a coupling with contacts for connection to the contacts of the receptacle, battery means in the readout unit connected across the ends of each potentiometer through the contacts in the coupling and receptacle, a voltage regulator network between the battery means and the coupling contacts including a series resistance in series with the battery means and further including a non linear shunt element having a rapid increase in current whenever the voltage exceeds a rated value less than the voltage of the battery means, and a plurality of galvanometers in the readout unit, one connected across the wiper and one end of each potentiometer whereby each galvanometer indicates the register shaft position for a different order of digits.

3. A remote reading system for a meter having a register with a plurality of shafts, one for each order of digits, comprising a plurality of potentiometers, one for each shaft, and each having a wiper rotated by the associated shaft, a multiconductor cable having a pair of conductors connected respectively to opposite ends of each potentiometer and a conductor connected to the wipers of all potentiometers, a receptacle remote from the meter having contacts for the respective conductors, a meter readout device having a coupling for connection to the contacts of the receptacle, battery means connected across the ends of the potentiometers through the contacts in the coupling and receptacle, a plurality of galvanometers in the readout, one connected across the wiper and one end of each potentiometer whereby each galvanometer indicates the register shaft position for a different order of digits, and a voltage regulator network between the battery means and the coupling contacts comprising at least one section of a load resistance in series with non linear shunt element having a rapid increase in current whenever the voltage exceeds a rated value less than the voltage of the battery means.

4. A remote reading system for a meter having a register with a plurality of shafts, one for each order of digits, comprising a plurality of potentiometers, one for each shaft, and each having a wiper rotated by the associated shaft, a multiconductor cable having power supply conductors connected to opposite ends of each potentiometer and a conductor connected in parallel to the wipers of all potentiometers, a receptacle remote from the meter having contacts for the respective conductors, a meter readout unit having a coupling with contacts for connection to the contacts of the receptacle, battery and voltage regulator means in the readout unit connected across the ends of the potentiometer through the contacts in the coupling and receptacle, said voltage regulator comprising a network across the battery, one side of the network being connected to one side of the battery, the other side of the network being connected to the other side of the battery through a contact in the receptacle, and a plurality of galvanometers in the readout unit, each connected across the wiper and one end of a different potentiometer whereby each galvanometer indicates the register shaft position for a different order of digits.

5. A remote reading system for a meter having a register with a plurality of shafts, one for each order of digits, comprising a plurality of potentiometers, one for each shaft, and each having a wiper rotated by the associated shaft, a multiconductor cable having power supply conductors connected to opposite ends of each potentiometer and a conductor connected to the wipers of all potentiometers, a receptacle remote from the meter having contacts for the respective conductors, a meter readout device having a coupling for connection to the contacts of the receptacle, battery and voltage regulator means in the readout unit connected across the ends of the potentiometer through the contacts in the coupling and receptacle, said voltage regulator comprising a network comprising at least one section of a load resistance in series with non linear shunt element having a rapid increase in current whenever the voltage exceeds a rated value less than the voltage of the battery means, one side of the network being connected to one side of the battery, the other side of the network being connected to the other side of the battery through a contact in the receptacle, and a plurality of galvanometers in the readout, each connected across the wiper and one end of a different potentiometer whereby each galvanometer indicates the register shaft position for a different order of digits.

References Cited in the file of this patent

UNITED STATES PATENTS

| | | |
|---|---|---|
| 1,244,634 | Neff et al. | Oct. 30, 1917 |
| 1,533,680 | Wiederhold | Apr. 14, 1925 |
| 1,605,116 | Kellum | Nov. 2, 1926 |
| 2,712,127 | Miller | June 28, 1955 |
| 2,769,340 | Bernreuter et al. | Nov. 6, 1956 |
| 2,974,279 | Barry et al. | Mar. 7, 1961 |